J. J. McDADE AND F. P. DONNELLY.
HOBBLE FOR MOTOR VEHICLES.
APPLICATION FILED FEB. 9, 1918.
1,304,785.
Patented May 27, 1919.
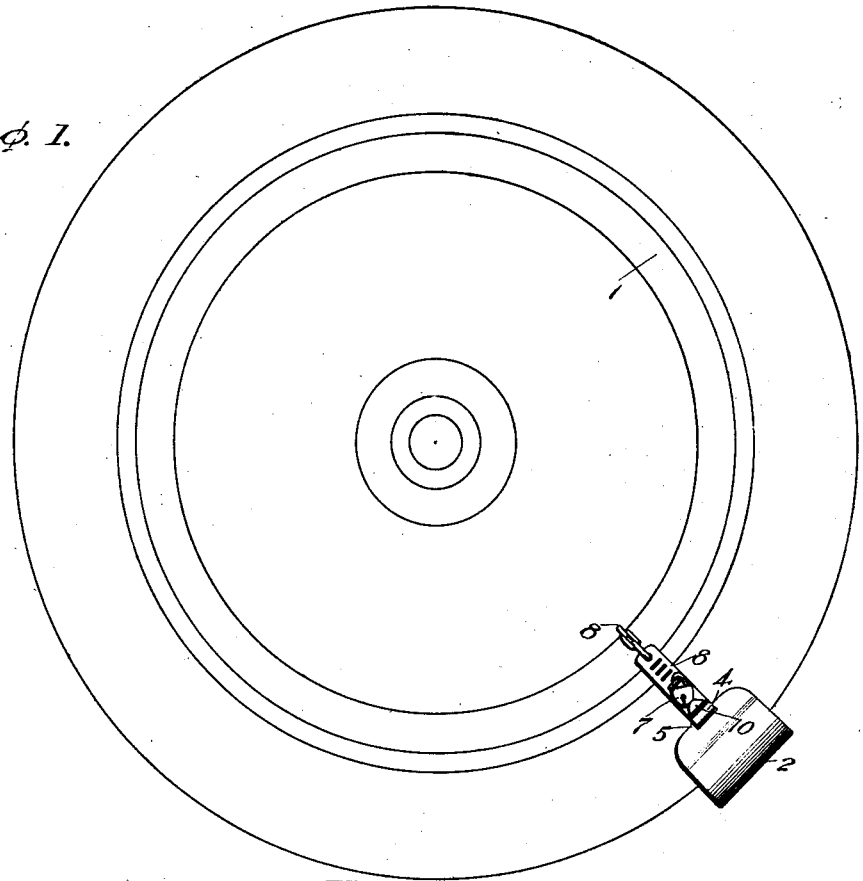
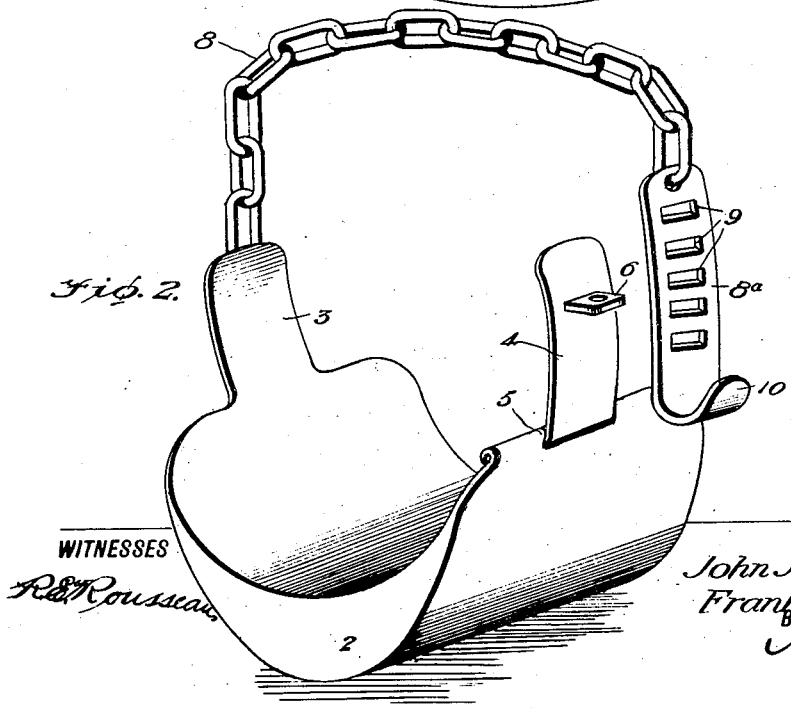
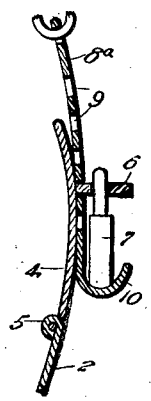
INVENTOR
John J. M<sup>c</sup>Dade,
Frank P. Donnelly,
BY
ATTORNEYS

UNITED STATES PATENT OFFICE.

JOHN J. McDADE AND FRANK P. DONNELLY, OF DORCHESTER, MASSACHUSETTS.

HOBBLE FOR MOTOR-VEHICLES.

1,304,785. Specification of Letters Patent. Patented May 27, 1919.

Application filed February 9, 1918. Serial No. 216,291.

*To all whom it may concern:*

Be it known that we, JOHN J. McDADE and FRANK P. DONNELLY, citizens of the United States, and residents of Dorchester, in the county of Suffolk and State of Massachusetts, have invented certain new and useful Improvements in Hobbles for Motor-Vehicles, of which the following is a specification.

Our invention is an improvement in hobbles for motor vehicles, and has for its object to provide a device of the character specified adapted to be locked upon the wheel of a motor vehicle, to lift the wheel once during each rotation thereof, to impart an uneven or hobbling motion to the vehicle, to add an unwonted or unusual condition in the vehicle, to call attention to the same.

In the drawings:

Figure 1 is a side view of a motor vehicle wheel, with the improvement in place;

Fig. 2 is a perspective view of the hobble;

Fig. 3 is a vertical section through the hasp.

The present embodiment of the invention is shown in connection with the wheel 1 of a motor vehicle, and the improvement comprises a hobble consisting of an arc shaped plate 2, which is of considerable thickness at its center, as shown more particularly in Fig. 2, gradually decreasing in thickness toward its ends, and at each end the plate has an extension 3 and 4, respectively.

The extension 3, as shown, is integral with the plate, while the extension 4 is hinged to the plate as indicated at 5 in order to swing toward and from the extension 3. This extension also has a staple 6 on its outer face, the staple having the usual opening for receiving the shackle of a pad-lock 7.

A flexible member, as, for instance, a chain 8, is connected with the extension 3, and this chain is of a length to pass around the felly when the plate 2 is engaged with the tire of the wheel, the convexity of the tire resting in the concavity of the plate.

A hasp plate 8ª is connected with that end of the chain remote from the extension 3, and this hasp plate, as shown, has a series of transverse slots 9, which are adapted to be engaged by the staple, to permit the passage of the staple through the hasp plate. At the end of the hasp plate remote from the chain there is a hook or finger-piece 10 for convenience in engaging and disengaging the hasp plate.

In use, when the driver is to leave the vehicle, for any length of time, the hobble is placed, being arranged on that portion of the tire which is not in engagement with the ground. The plate is placed as shown in Fig. 2, and the chain is passed about the felly, the hasp being engaged with the staple 6, after which the lock is applied.

Should, now, unauthorized parties start the vehicle, there will be imparted to the same a limping or hobbling motion, which will be unusual, and will attract attention, since the wheel and the vehicle will be lifted every time the hobble plate 2 passes beneath the wheel.

It will be evident that the hobble may be applied to any of the wheels, since its effect will be practically the same wherever applied.

We claim:

A hobble for motor vehicles comprising a plate formed arcuate for conforming engagement upon the tread of a tire and adapted to raise the wheel from the ground during each rotation thereof to impart a limping movement to the vehicle, an ear hingedly connected with one side edge of said plate, a lug formed on said ear and extending outwardly therefrom, a flexible member connected with the opposite edge of said plate, a hasp plate connected with said flexible member and provided with a plurality of openings engageable selectively upon said lug, said flexible member being adapted to pass about the felly of the wheel, and the free end of said hasp plate being reflexly curved whereby to provide finger engaging means whereby the flexible member and hasp plate may be drawn firmly about the felly, said lug being apertured for engagement by a padlock.

JOHN J. McDADE.
FRANK P. DONNELLY.

Witnesses:
J. WALTER MULLEN,
WILLIAM A. KELLEY.